(12) United States Patent
Wada et al.

(10) Patent No.: US 7,050,093 B1
(45) Date of Patent: May 23, 2006

(54) VIDEO CAMERA PIVOTING APPARATUS, A PIVOTING VIDEO CAMERA APPARATUS, AND A MONITORING SYSTEM WITH A PIVOTING VIDEO CAMERA

(75) Inventors: Jyoji Wada, Yokohama (JP); Yoshifumi Yano, Yokohama (JP); Noboru Takada, Yokohama (JP); Kazushige Tamura, Sagamihara (JP)

(73) Assignee: Industrial Electric Industrial Co., Ltd., Osaka (JP)

( * ) Notice: Subject to any disclaimer, the term of this patent is extended or adjusted under 35 U.S.C. 154(b) by 0 days.

(21) Appl. No.: 09/323,397

(22) Filed: Jun. 1, 1999

(30) Foreign Application Priority Data

Jun. 15, 1998 (JP) ............................................ 10-167514

(51) Int. Cl.
*H04N 5/232* (2006.01)
*G09G 5/08* (2006.01)

(52) U.S. Cl. .............................. 348/211.99; 348/211.7; 345/159; 345/161

(58) Field of Classification Search ................ 348/14.1, 348/14.05, 211.99, 211.7, 211.8, 211.9, 211.13, 348/211.14, 143; 345/159, 161, 156, 157; 74/471 XY
See application file for complete search history.

(56) References Cited

U.S. PATENT DOCUMENTS

| | | | | |
|---|---|---|---|---|
| 3,984,628 A | * | 10/1976 | Sharp ....................... | 348/211.8 |
| 4,218,702 A | | 8/1980 | Brocard et al. | |
| 5,068,735 A | | 11/1991 | Tuchiya et al. | |
| 5,432,530 A | * | 7/1995 | Arita et al. ................ | 345/159 |
| 5,479,203 A | * | 12/1995 | Kawai et al. ............. | 348/14.1 |
| 5,598,209 A | * | 1/1997 | Cortjens et al. ....... | 348/211.12 |
| 5,719,622 A | * | 2/1998 | Conway ................... | 348/211.8 |
| 5,745,166 A | * | 4/1998 | Rhodes et al. ........... | 348/143 |
| 5,838,368 A | * | 11/1998 | Masunaga et al. ....... | 348/211.9 |

FOREIGN PATENT DOCUMENTS

| | | |
|---|---|---|
| EP | A 525 482 | 2/1993 |
| EP | 0 525 482 | 2/1993 |
| EP | 0 692 914 A | 1/1996 |
| GB | A 2 314 609 | 1/1998 |
| JP | 54-145430 | 11/1979 |
| JP | 60-118819 | 6/1985 |
| JP | 5-47933 | 6/1993 |
| JP | 05-244470 | 9/1993 |
| JP | 6-62285 | 3/1994 |
| JP | 06-301434 | 10/1994 |
| JP | 07-282685 | 10/1995 |
| WO | WO-95/35624 | 12/1995 |

* cited by examiner

*Primary Examiner*—Wendy R. Garber
*Assistant Examiner*—Luong T. Nguyen
(74) *Attorney, Agent, or Firm*—Connolly Bove Lodge & Hutz LLP

(57) ABSTRACT

A pivoting unit pivots a video camera at a pivoting speed. The video camera includes a zoom mechanism and a zoom amount signal generation circuit for generating a zoom amount signal. A pivoting speed command signal generating circuit responsive to an operation generates a pivoting speed command signal and a speed controlling circuit controls the pivoting speed in accordance with the zoom amount signal and the pivoting speed command signal. Controlling is made such that the pivoting speed is relatively decreased from the pivoting speed command signal when the zoom amount signal indicates a telephoto side and is relatively increased from the pivoting speed command signal when the zoom signal indicates a wide-angle. A joystick generating the pivoting speed command signal includes two coil springs for generating a reaction force which is made stronger when the operation angle of thereof exceeds a reference. The pivoting speed is also accelerated when the operation angle exceeds the reference.

4 Claims, 4 Drawing Sheets

VIDEO CAMERA PIVOTING APPARATUS, A PIVOTING VIDEO CAMERA APPARATUS, AND A MONITORING SYSTEM WITH A PIVOTING VIDEO CAMERA

BACKGROUND OF THE INVENTION

1. Field of the Invention

This invention relates to a video camera pivoting apparatus for pivoting a video camera, a pivoting video camera apparatus, and a video monitoring system with a pivoting video camera.

2. Description of the Prior Art

A pivoting video camera apparatus including a video camera and a universal base unit supporting the video camera of which tilting and panning is controlled is known.

Japanese patent provisional publication No. 54-145430 discloses a rotary base for television camera including a swivel base, a vertical rotating motor, and a horizontal rotating motor and a detection circuit for detecting a zoom ratio. The horizontal and vertical rotating speeds are controlled in accordance with only detected zoom ratio when an operation switch is operated.

Japanese patent application provisional publication No. 6-62285 discloses a universal head controller, wherein the panning and tilting speeds are automatically controlled in accordance with only zooming position.

SUMMARY OF THE INVENTION

The aim of the present invention is to provide a superior video camera pivoting apparatus for pivoting a video camera, a superior pivoting video camera apparatus, and a superior video monitoring system with a pivoting video camera.

According to the present invention, a video camera pivoting apparatus is provided which includes: a pivoting unit for pivoting a video camera at a pivoting speed, the video camera including a zoom mechanism and a zoom amount signal generation circuit for generating a zoom amount signal; a pivoting speed command signal generating circuit responsive to an operation for generating a pivoting speed command signal; and a speed controlling circuit for controlling the pivoting speed in accordance with the zoom amount signal and the pivoting speed command signal. In the video camera pivoting apparatus, the speed controlling circuit controls the pivoting speed in accordance with the zoom amount signal and the pivoting speed command signal such that the pivoting speed is relatively decreased from the pivoting speed command signal when the zoom amount signal indicates a telephoto side and is relatively increased from the pivoting speed command signal when the zoom signal indicates a wide-angle.

In the video camera pivoting apparatus, the pivoting speed command signal generation circuit includes a joy stick mechanism and generates the pivoting speed command signal such that a value of the pivoting speed command signal increases at a first rate with respect to an operation angle of the joystick mechanism when the operation angle is not greater than a reference operation angle and at a second rate with respect to the operation angle of the joystick mechanism when the operation angle is greater than the reference operation angle, the second rate being greater than the first rate. In this case, the joystick mechanism includes a reaction force generation unit for generates a reaction force such that the reaction force increases at a third rate with respect to an operation angle of the joystick mechanism when the operation angle is not greater than the reference operation angle and at a fourth rate with respect to the operation angle of the joystick mechanism when the operation angle is greater than the reference operation angle, the fourth rate being greater than the third rate in order to inform the operator that the value of the pivoting speed command signal increases at the second rate. In this case, the reaction force generation unit includes first and second springs respectively having first and second spring constants. The reaction force is generated by the first spring when the operation angle is not greater than the reference operation angle, and the reaction force is generated by the first and second springs when the operation angle is greater than the reference operation angle. In this case, the second spring constant may be greater than the first spring index.

The video camera pivoting apparatus may further include: a sequential control unit for storing a sequential program and generating another pivoting speed command signal in accordance with the sequential program; a detecting circuit for detecting that the pivoting speed command signal generation circuit generates the pivoting speed command signal in response to the operation; a switch circuit for supplying the pivoting speed command signal to the speed controlling circuit when the detecting circuit detects that the pivoting speed command signal generation circuit generates the pivoting speed command signal in response to the operation and supplying another pivoting speed command signal to the speed controlling circuit when the detecting circuit does not detect that the pivoting speed command signal generation circuit generates the pivoting speed command signal in response to the operation and supplying another pivoting speed command signal to the speed controlling circuit.

According to this invention, a pivoting video camera apparatus is provided which includes: a video camera having a zoom lens mechanism; a zoom amount detection circuit responsive to the zoom lens mechanism for generating a zoom amount signal indicative of an amount of zooming of the zoom lens mechanism; a pivoting unit for pivoting the video camera at a pivoting speed; a pivoting speed command signal generating circuit for generating a pivoting speed command signal; and a speed controlling circuit for controlling the pivoting speed in accordance with the zoom amount signal and the pivoting speed command signal such that the pivoting speed is relatively decreased from the pivoting speed command signal when the zoom amount signal indicates a telephoto side and is relatively increased from the pivoting speed command signal when the zoom signal indicates a wide-angle.

According to this invention, a video monitoring system is provided which includes: a video camera unit including: a video camera having a zoom lens mechanism; a zoom amount detection circuit responsive to the zoom lens mechanism for generating a zoom amount signal indicative of an amount of zooming of the zoom lens mechanism; a pivoting unit for pivoting the video camera at a pivoting speed controlled in accordance with a speed control signal; and a monitor site including: a video monitor located remote from the video camera for displaying an image from the video camera; a pivoting speed command signal generating circuit arranged adjacent to the video monitor for generating a pivoting speed command signal; and a speed control signal generation circuit for generating the speed control signal in accordance with the zoom amount signal and the pivoting speed command signal, wherein the speed control signal generation circuit generates the speed control signal such that the pivoting speed is relatively decreased from the pivoting speed command signal when the zoom amount signal indicates a telephoto side and is relatively increased from the pivoting speed command signal when the zoom signal indicates a wide-angle.

BRIEF DESCRIPTION OF THE DRAWINGS

The object and features of the present invention will become more readily apparent from the following detailed description taken in conjunction with the accompanying drawings in which.

The same or corresponding elements or parts are designated with like references throughout the drawings.

DETAILED DESCRIPTION OF THE INVENTION

Hereinbelow will be described an embodiment of this invention.

Figure 1:
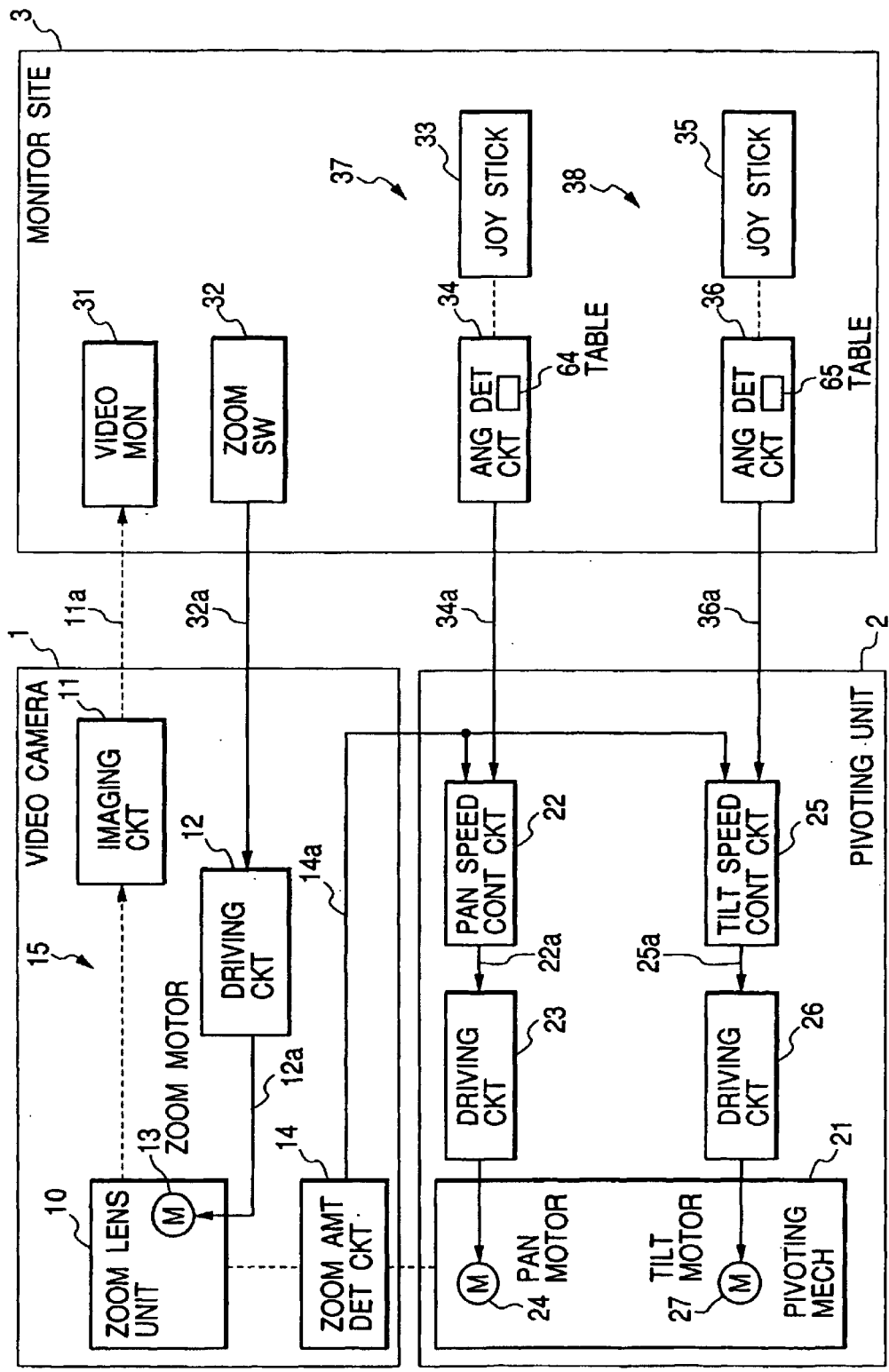
FIG. 1 is a block diagram of a video monitoring system with a pivoting video camera of an embodiment of this invention.
Figure 2:
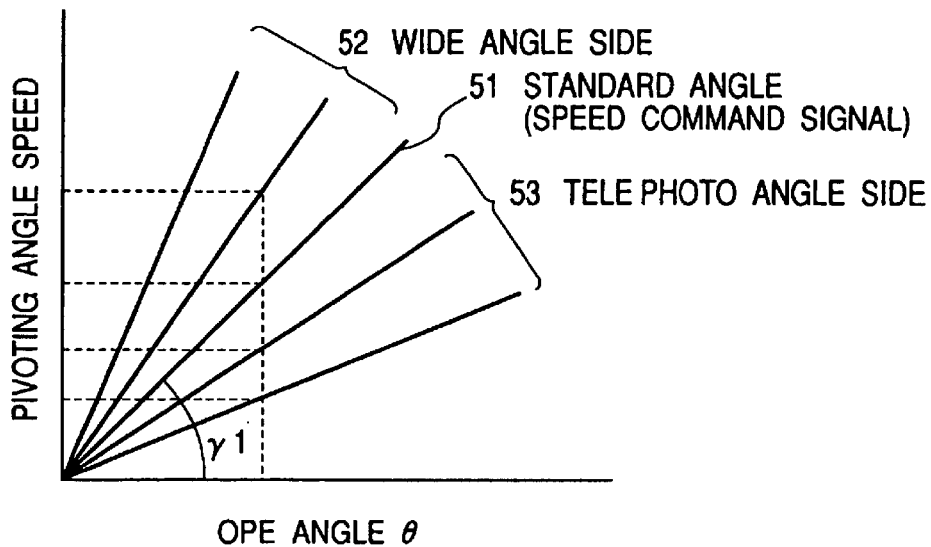
FIG. 2 is a graphical drawing of this embodiment showing a relation between a pivoting angle speed and the operation angle of the joystick shown in FIG. 1.
Figure 3:
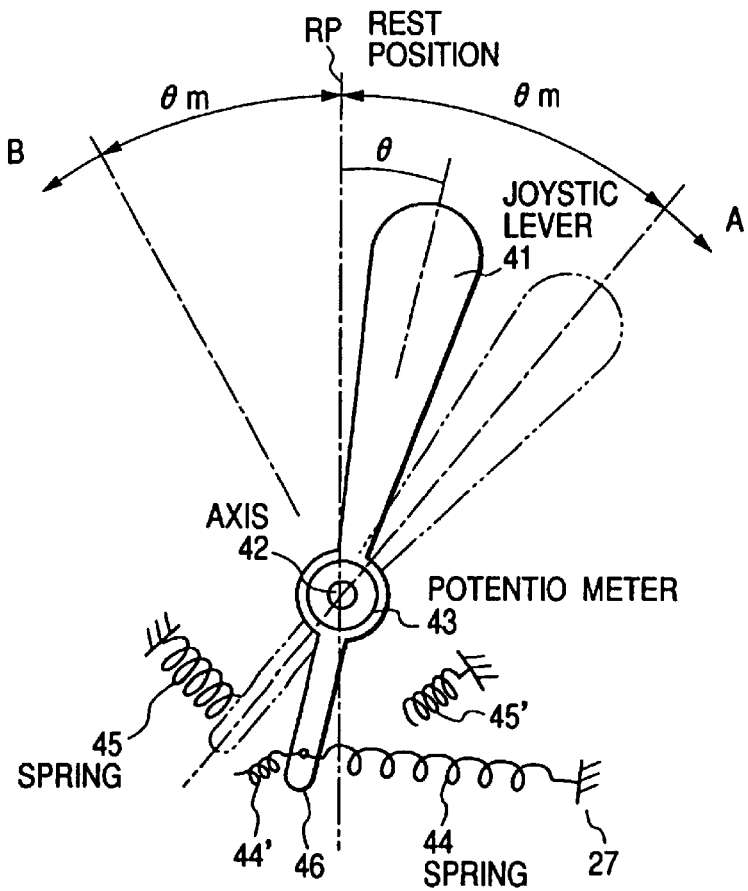
FIG. 3 is a side view of the joystick of the first embodiment.

FIG. 1 is a block diagram of a video monitoring system with a pivoting video camera of this embodiment. FIG. 2 is a graphical drawing of this embodiment showing a relation between a pivoting (panning or tilting) angle speed and the operation angle of the joystick shown in FIG. 1. FIG. 3 is a side view of the joystick of the first embodiment.

The video monitoring system of this invention includes a video camera 1 for receiving an image and generating a video signal with a zoom mechanism 15, a pivoting unit 2 for supporting the video camera 1 and panning and tilting the video camera 1 in accordance with a panning speed command signal 34a and a tilting speed command signal 36a, and a monitor site 3 for providing a monitor image in response to the video signal 11a to an operator, supplying a zoom command signal 32a to the zoom mechanism 15, and supplying a panning speed command signal 34a, and a tilting speed command signal 36a to the pivoting unit 2.

The video camera 1 includes an imaging circuit 11, the zoom mechanism 15 including a zoom lens unit 10, a driving circuit 12, and a zoom amount detection circuit 14. The imaging circuit 11 receives the image through the zoom lens unit 10 and generates the video signal 11a. The zoom lens unit 10 receives the image and forms the image on an imager (not shown) of the imaging circuit 11. The driving circuit 12 generates a zoom driving signal 12a in response to the zoom command signal 32a. A zoom motor 13 included in the zoom lens unit 10 drives the zoom lens assembly (not shown) of the zoom lens unit 10 to control a zoom amount. The zoom amount detection circuit 14 responsive to the zoom lens unit 10 generates the zoom amount signal 14a indicative of an amount of zooming of the zoom lens unit 10.

The video camera 1 and the pivoting unit 2 supporting the video camera 1 communicate with the monitor site by cables or a network such as a telephone line.

The pivoting unit 2 includes a pivoting mechanism 21 including a pan motor 24 for providing panning the video camera 1 and a tilt motor 27 for providing tilting the video camera 1, a pan speed control circuit 22 for generating a panning speed signal 22a, a driving circuit 23 for driving the pan motor 24 in accordance with the panning speed signal 22a, a tilt speed control circuit 25 for generating a tilt speed signal 25a, a driving circuit 26 for driving the tilt motor 27 in accordance with the tilt speed signal 25a.

The monitor site 3 locates remote from the video camera 1 and the pivoting unit 2 and includes a video monitor 31 for displaying the monitor image in response to the video signal 11a from the video camera 1, a panning speed command signal generating circuit 37 arranged adjacent to the video monitor 31 for generating a panning speed command signal 34a, a tilt speed command signal generating circuit 38 arranged adjacent to the video monitor for generating a tilting speed command signal 36a.

The panning speed command signal generation circuit 37 includes a joystick 33 and an angle detection circuit 34 for detecting an operation angle of the joystick 33 and for generating the panning speed command signal 34a.

The tilt speed command signal generation circuit 38 includes a joystick 35 and an angle detection circuit 36 for detecting an operation angle of the Joystick 35 and for generating the tilt speed command signal 36a.

The video monitoring system is provided in a building at remote places or buildings remote from each other to monitor predetermined remote places. The video camera 1 and the pivoting unit 2 are arranged at a position suitable for monitoring. For example, the pivoting unit 2 is fixed to a wall of a building. The video camera 1 receives an image of a portion of the place and generates the video signal which is transmitted to the monitor site 3 through a cable or the like. The video camera 1 includes the zoom mechanism 15 to provide a wide-angle image, a standard angle image or a telephoto image. The pivoting unit 2 supports the video camera 1 and pans the video camera 1 (in the horizontal direction) in accordance with the panning speed command signal 34a and tilts the video camera 1 (in the vertical direction) in accordance with the tilting speed command signal 36a.

The monitor site 3 provides the monitor image received by the video camera 1 to the operator in response to the video signal 11a. The operator operate the zoom switch 32 to control the zoom mechanism 15 by supplying the zoom command signal 32a to the zoom mechanism 15 toward the telephoto side to more clearly watch the monitor image or toward the wide-angle side to widely watch the monitor image.

In the normal condition, the operator watches the monitor image in a wide-angle condition. When the operator is aware of a trouble on the monitor image, the operator operates the joysticks 33 and 35, and the zoom switch 32 to direct the video camera 1 to the trouble occurring place.

Then, the video camera 1 controls the amount of zoom in response to the zoom command signal 32a. On the other hand, the pivoting unit 2 pans and tilts the video camera 1 in response to the panning speed command signal 34a and tilting speed command signal 36a to direct the video camera to the trouble occurring place.

The joystick 33 is at an upright condition (rest position RP) when it is not operated and inclined with action by the operator. The angle detecting circuit 34 detects the operation angle (inclined angle) θ with a potentiometer 43 of which axis 42 is connected to an end of the joystick 33. The angle detection circuit 34 generates the panning speed command signal 34a in accordance with the operation angle of the joystick 33. The pan speed control circuit 22 generates the panning speed signal 22a in accordance with the zoom amount signal 14a and the panning speed command signal 34a such that the panning speed is relatively decreased from the panning speed command signal 34a when the zoom amount signal 14a indicates a telephoto side and is relatively increased from the panning speed command signal 34a when the zoom amount signal 14a indicates a wide-angle side.

As shown in FIG. 2, the pan speed control circuit 22 generates the panning speed signal 22a in accordance with the zoom amount signal 14a and the panning speed command signal 34a. When the amount of zoom is at a standard angle 51, the pivoting (panning) angle speed signal is not compensated substantially, that is, the panning speed command signal 34a is outputted as the panning speed signal 22a as it is. On the other hand, when the amount of zoom is telephoto angle side 53, a gamma γ 1 of the panning speed command signal 34a is relatively decreased to provide the panning speed signal 22a. Moreover, when the amount of zoom is wide angle side 52, the gamma γ 1 of the panning speed command signal 34a is relatively increased to provide the panning speed signal 22a.

The driving circuit 23 drives the pan motor 24 in accordance with the panning speed signal 22a and the pan motor 24 rotates to pan the video camera 1.

The joystick 35 is at an upright condition when it is not operated and inclined with action by the operator. The angle detecting circuit 36 detects the operation angle (inclined angle) with a potentiometer 43 of which axis 42 is connected to an end of the joystick 35. The angle detection circuit 36 generates the tilting speed command signal 36a in accordance with the operation angle of the joystick 35. The tilt speed control circuit 25 generates the tilting speed signal 25a in accordance with the zoom amount signal 14a and the tilt speed command signal 36a such that the tilting speed is relatively decreased from the tilt speed command signal 36a when the zoom amount signal 14a indicates the telephoto side 53 and is relatively increased from the tilt speed command signal 36a when the zoom amount signal 34a indicates the wide-angle side 52.

As shown in FIG. 2, the tilt speed control circuit 25 generates the tilt speed signal 25a in accordance with the zoom amount signal 14a and the tilt speed command signal 36a. When the amount of zoom is at the standard angle 51, the tilt angle speed signal is not compensated, that is, the tilt speed command signal 36a is outputted as the tilt speed signal 25a as it is. On the other hand, when the amount of zoom is telephoto angle 53, a gamma of the tilting speed command signal 36a is relatively decreased (compensated) to provide the tilt speed signal 25a. Moreover, when the amount of zoom is wide angle side 52, the gamma of the tilt speed command signal 34a is relatively increased (compensated) to provide the tilt speed signal 25a.

The driving circuit 26 drives the tilt motor 27 in accordance with the tilt speed signal 25a and the tilt motor 27 rotates to tilts the video camera 1.

As shown in FIG. 3, the joystick 33 includes a joystick lever 41, and a potentiometer 43 of which axis 42 is connected to the joystick lever 41, so that the operation angle θ is detected by the potentiometer 43. The opposite end 46 of the joystick lever 41 is connected to an end of a spring 44 of which other end is connected to a case 27 of the joystick 33 to provide a reaction force to the operator when the operator inclines the lever 41 in the direction A and returns the joystick lever 41 to the rest position RP when an operation force is removed. The spring 45 receives the end 46 of the joystick lever 41 when the operation angle θ exceeds a reference angle θ m to provide an additional second reaction force which is stronger than the reaction force only by the spring 44. This makes the reaction force stronger when the operation angle exceeds the reference angle θ m. That is, a spring constant {k=W/δ(Kg/mm)} of the spring 45 is higher than a spring constant of the spring 44.

The joystick lever 41 is also inclined to the opposite direction B and spring 44' and 45' also generates reaction forces similarly to pivot the video camera in the opposite direction.

Figure 4:
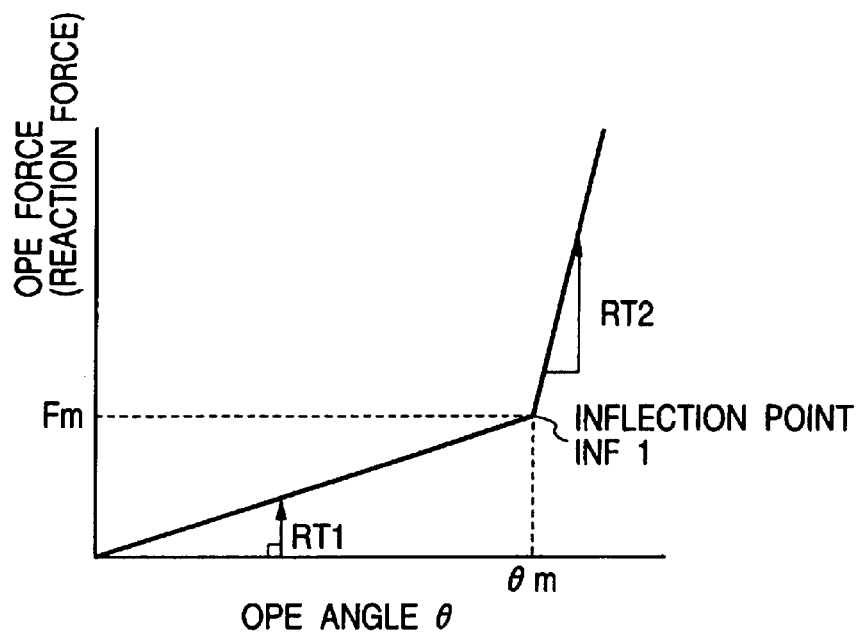
FIG. 4 is a graphical drawing of the embodiment showing a relation between the operation force and the joysticks shown in FIG. 1.

FIG. 4 is a graphical drawing of the embodiment showing a relation between the operation force and the joysticks 33 and 35. The joystick 33 or 35 inclines at a operation angle θ in accordance with the operation force F applied by the operator. That is, in the joy stick 33 or 35, the springs 44, 45, 44', and 45' generates the reaction force such that the reaction force increases at a rate RT1 (gamma) with respect to the operation angle of the joystick mechanism when the operation angle is not greater than the reference operation angle θ m and at a rate RT2 with respect to the operation angle θ of the joystick mechanism when the operation angle is greater than the reference operation angle θ m. The rate RT2 is greater than the rate RT1.

The angle detection circuits 34 and 36 include ROM tables for generating the panning speed command signal 32a and the tilt speed command signal 36a in accordance with the detection of the operation angle of the joysticks 33 and 35, respectively.

Figure 5:
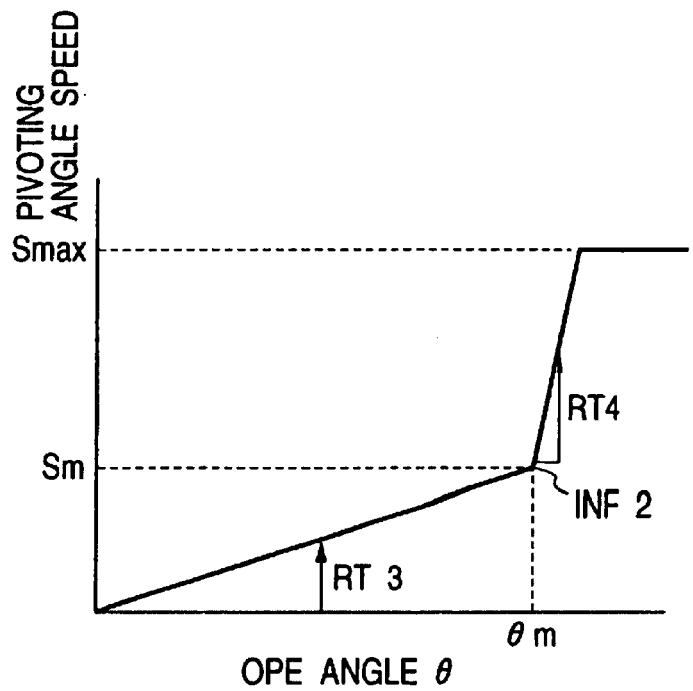
FIG. 5 is a graphical drawing of the embodiment showing a table representing a relation between the pivoting angle speed and the operation angle θ of the joysticks show FIG. 1.

FIG. 5 is a table of the embodiment showing a relation between the pivoting (panning and tilting) angle speed and the operation angle θ of the joysticks 33 and 35.

The panning and tilt speed command signals 34a and 36a increase at a rate RT3 when the operation angles θ of the joysticks 33 and 35 are not greater than the reference angle θ m, respectively. Then, the panning and tilt speed command signals 34a and 36a increase at a rate RT4 when the operation angles θ of the joysticks 33 and 35 are greater than the reference angle θ m, respectively. The rate RT4 is greater than the rate RT3. Therefore, the panning motor 24 and the tilt motor 27 are driven at an extremely high speed when the operation angles of the joysticks 33 and 35 are greater than the reference angle θ m. Accordingly, the pan motor 24 and the tilt motor 27 reach to max speeds rapidly, so that the interval for directing the monitor screen to the target is shortened.

As shown in FIG. 4 the reaction force to the lever 41 is more increased when the operation angle θ exceeds the reference angle θ m at an inflection point INF1 and as shown in FIG. 5, the pivoting (panning and tilting) speeds are more increased when the operation angle exceeds the reference angle θ m at an inflection point INF2. The inflection point INF1 in FIG. 4 corresponds to the inflection point INF2 in FIG. 5. Therefore, more increase in the reaction force above the inflection point INF1 provides an attention of more increase in the pivoting speed to the operator.

In the embodiment of this invention, the video camera 1 and the pivoting unit 2 are separated from each other. However, it is also possible that the video camera 1 and the pivoting unit 2 are united.

Figure 6:
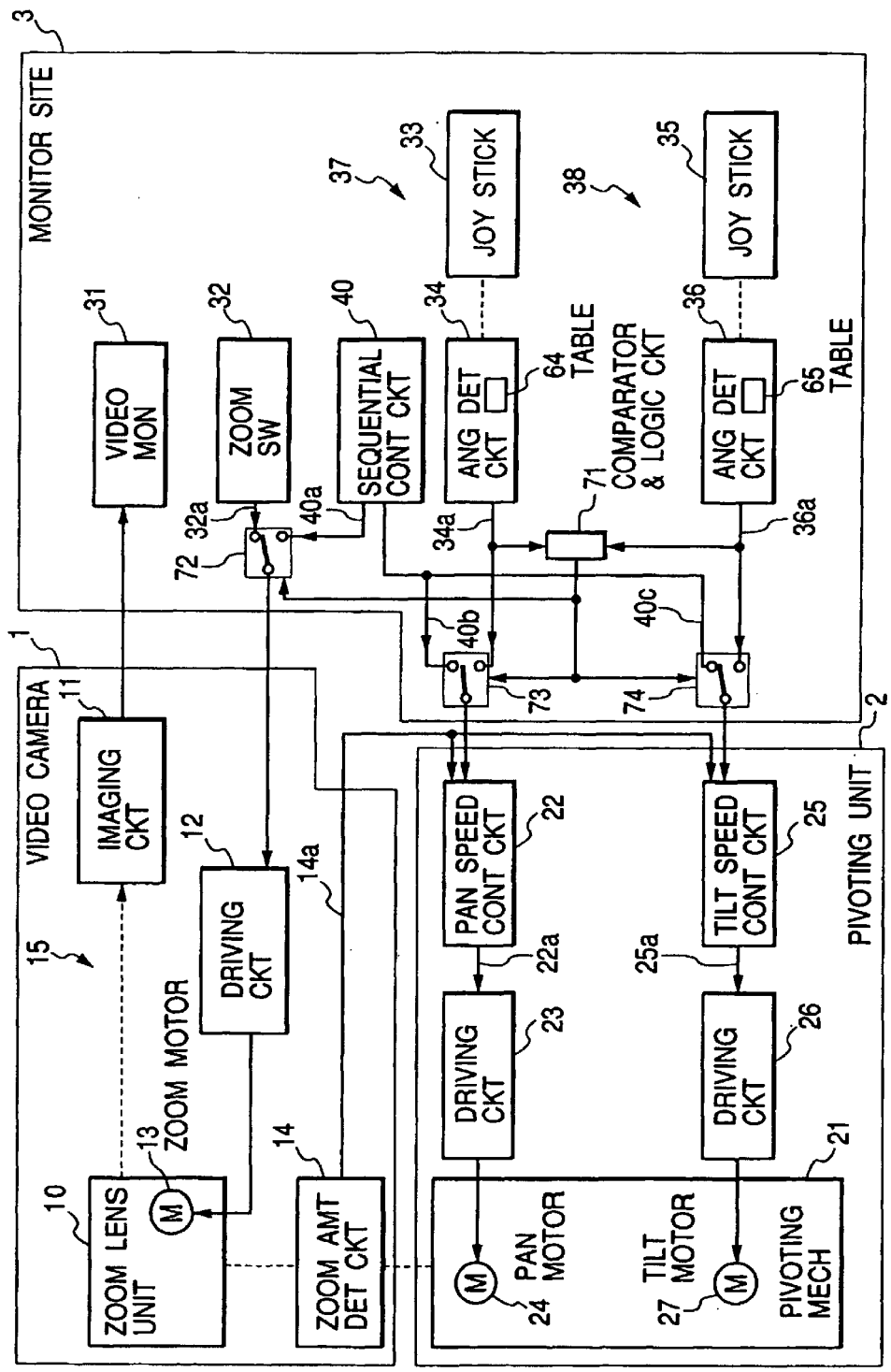
FIG. 6 is a block diagram of a modification of this invention.

FIG. 6 is a block diagram of a modification of this invention. The structure of the modification is substantially the same as the embodiment shown in FIG. 1. The difference is that a sequential control circuit 40 and a comparing and logic circuit 71, switches 73 and 74 are further provided and a switch 72 is further provided.

The sequential control circuit 40 stores a sequential program for sequentially generating another zoom command signal, another panning speed command signal, and another tilt speed command signal to provide the monitor image to the operator at the monitor site in an automatically monitoring mode.

When the operator operates either of the joystick 33 or 35, a potential from the angle detection circuit 34 or 36 deviates from the potential corresponding to the rest position RP, for example, deviates from zero volt.

The comparator and logic circuit 71 detects that either of the potential from the angle detection circuit 34 or 36 deviates from zero volt more than a predetermined voltage. If the comparator and logic circuit 71 detects that either of the potential from the angle detection circuit 34 or 36 deviates from zero volt more than a predetermined voltage, the switches 72 to 74 supplies the zoom command signal 32a, the panning speed command signal 34a, and the tilt speed command signal 36ainstead another zoom command signal 40a, another panning speed command signal 40b, and another tilt speed command signal 40c. That is, the operation of the joystick 33 or 35 overrides the sequential control circuit 40.

What is claimed is:

1. A video camera pivoting apparatus comprising:
   pivoting means for pivoting a video camera at a pivoting speed, said video camera including a zoom mechanism and zoom amount signal generation means for generating a zoom amount signal;
   pivoting speed command signal generating means responsive to an operation for generating a pivoting speed command signal; and
   speed controlling means for controlling said pivoting speed in accordance with said zoom amount signal and said pivoting speed command signal;
   said pivoting speed command signal generating means having a joystick mechanism to generate said pivoting speed command signal such that a value of said pivoting speed command signal increases at a first rate with respect to an operation angle of said joystick mechanism when said operation angle is not greater than a reference operation angle, at a second rate with respect to said operation angle of said joystick mechanism when said operation angle is greater than said reference operation angle, said second rate being greater than said first rate, said value of said pivoting speed command signal assumes a maximum value when said operation angle of said joystick mechanism is greater than another reference operation angle which is greater than said first-mentioned mentioned reference operation angle.

2. A video camera pivoting apparatus comprising:
   pivoting means for pivoting a video camera at a pivoting speed, said video camera including a zoom mechanism and zoom amount signal generation means for generating a zoom amount signal;
   pivoting speed command signal generating means responsive to an operation for generating a pivoting speed command signal;
   speed controlling means for controlling said pivoting speed in accordance with said zoom amount signal and said pivoting speed command signal;
   said pivoting speed command signal generating means having a joystick mechanism to generate said pivoting speed command signal such that a value of said pivoting speed command signal increases at a first rate with respect to an operation angle of said joystick mechanism when said operation angle is not greater than a reference operation angle, at a second rate with respect to said operation angle of said joystick mechanism when said operation angle is greater than said reference operation angle, said second rate being greater than said first rate; and
   wherein said joystick mechanism includes reaction force generation means for generating a reaction force such that said reaction force increases at a third rate with respect to an operation angle of said joystick mechanism when said operation angle is not greater than a reference operation angle and at a fourth rate with respect to said operation angle of said joystick mechanism when said operation angle is greater than said reference operation angle, said fourth rate being greater than said third rate in order to inform the operator that said value of said pivoting speed command signal increases at said second rate.

3. The video camera pivoting apparatus as claimed in claim 2, wherein said reaction force generation means comprises first and second springs respectively having first and second spring constants, said reaction force is generated by said first spring when said operation angle is not greater than said reference operation angle, and said reaction force is generated by said first and second springs when said operation angle is greater than said reference operation angle.

4. The video camera pivoting apparatus as claimed in claim 3, wherein said second spring constant is greater than said first spring constant.

* * * * *

UNITED STATES PATENT AND TRADEMARK OFFICE
CERTIFICATE OF CORRECTION

| | |
|---|---|
| PATENT NO. | : 7,050,093 B1 |
| APPLICATION NO. | : 09/323397 |
| DATED | : May 23, 2006 |
| INVENTOR(S) | : Joyji Wada et al. |

It is certified that error appears in the above-identified patent and that said Letters Patent is hereby corrected as shown below:

(73) Assignee should read: Matsushita Electric Industrial Co., Ltd., (Osaka, JP)

Signed and Sealed this

Twenty-eighth Day of November, 2006

JON W. DUDAS
*Director of the United States Patent and Trademark Office*